Figure 1:
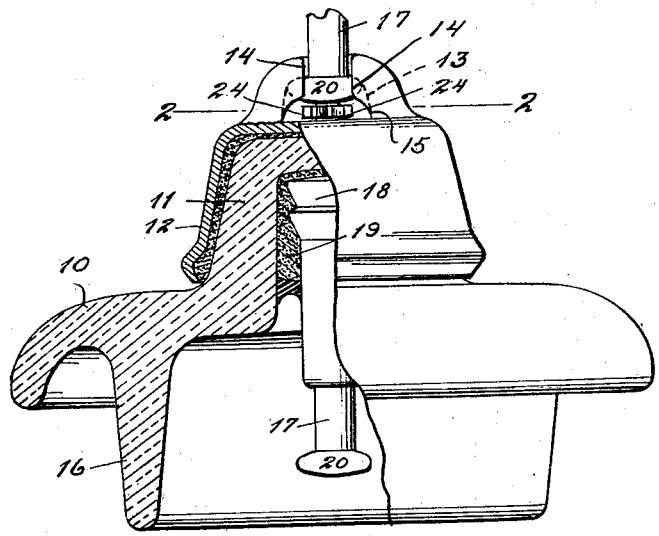

May 23, 1933.  K. A. HAWLEY  1,910,333
INSULATOR CONNECTION
Filed July 12, 1930

Inventor
Kent A. Hawley
By Ernest P. Mechlin
Attorney

Patented May 23, 1933

1,910,333

UNITED STATES PATENT OFFICE

KENT A. HAWLEY, OF BALTIMORE, MARYLAND, ASSIGNOR TO LOCKE INSULATOR CORPORATION, OF BALTIMORE, MARYLAND, A CORPORATION OF MARYLAND

INSULATOR CONNECTION

Application filed July 12, 1930. Serial No. 467,565.

The invention relates to insulators for the suspension of high tension transmission lines and has special reference to insulators of the cap and pin type.

It is well known that it is a common practice to make use of a string or chain of insulator units connected together in some suitable manner for suspending a conductor from a stationary support. Various expedients have been adopted for this purpose, the particular scheme concerned in this application being the provision in each insulator cap of a socket adapted to receive the ball head of a pin depending from the unit next above. After connection of two units is effected by engaging the ball head of one within the socket of the one next below it is customary to make use of a cotter pin traversing the socket beneath the ball head engaged therein for the purpose of preventing sufficient relative longitudinal movement of the unit to effect detachment of the ball head from within the socket. The standard type of cotter for this purpose is ordinarily of the type disclosed for example in the patent to Goddard No. 1,305,712 granted June 3rd, 1919 or in any one of numerous other patents not necessary to specify, cotters of such a variety being provided in one leg with a hump or projection which will cooperate with the inside of the socket for preventing withdrawal of the cotter from beneath the ball head when adjacent units are connected as described. When a cotter of this type is used in connecting insulators it must be partially withdrawn from the socket by means of a suitable tool subsequently to which the ball head on the pin of one insulator is slipped into the socket, after which the cotter is pushed home where it will remain because of the hump, until it is later positively withdrawn in case of necessity. This is easily accomplished with an ordinary insulator for there is ample room to obtain access to the cotter. However, in connection with insulators of other forms, for instance where one comes down closely over another this type of key is difficult to manipulate for the reason that in withdrawing it to effect connection of two of such close fitting insulators it sticks out very prominently from the side, making it difficult, if not almost impossible, to move the socket to one side to slip it over the ball. It is also rather difficult after this connection has been made to apply the force necessary to press the cotter home again.

It is with the above facts in view that I have conceived the present invention which has for its general object the provision of a novel locking or retaining means which need not be manually withdrawn from the socket when adjacent units are connected but which will operate automatically when the ball head of one unit is engaged within the socket of the next.

An important object of the invention is to provide a cotter and spring combination mounted permanently in the socket portion of an insulator cap and so arranged that when engaged by the ball head upon bringing together of adjacent units it will first be pushed out of the way and will then move by spring pressure into locking or retaining position.

Another object of the invention is to provide a locking arrangement of this character which will be very simple and inexpensive to make, easy to apply and use, positive in action, efficient and durable in service, and a general improvement in the art.

Figure 2:
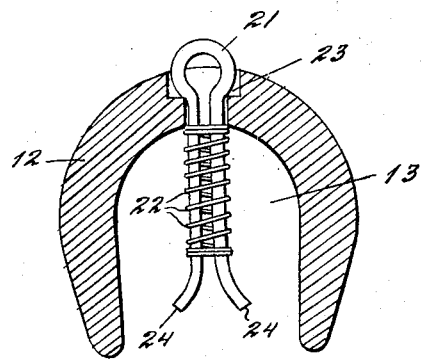

To the attainment of the foregoing and other objects and advantages, the invention preferably consists in the details of construction and the arrangement and combination of parts to be hereinafter more fully described and claimed, and illustrated in the accompanying drawing in which:

Figure 1 is a view of an insulator of the close nesting type, with parts broken away and in section, the insulator being equipped with my novel cotter arrangement, and Figure 2 is a horizontal section taken on the line 2—2 of Figure 1.

Referring more particularly to the drawing it will be observed that I have shown a suspension insulator of the cap and pin type including a porcelain body 10 having on its upper side a stem 11 about which is secured a metal cap 12 having a socket 13 with which communicates an opening 14 in the top of the cap and a slot 15 in the side thereof. At its underside the body 10 is formed with a depending petticoat 16 within the confines of which is located a pin 17 having a stepped upper end 18 cemented within a recess 19 which is formed in the underside of the stem. The pin 17 terminates at its lower end in a ball head 20. In connecting insulators of this type to form a string or chain, the ball head 20 of one is engaged within the socket 13 of the one next below by moving the units relatively laterally to pass the ball head through the slot 15 and into the socket, the pin 17 adjacent the ball head being received within the opening 14 in the top of the cap. It is of course necessary to introduce a cotter of some sort beneath the head 20 to prevent the units from being moved apart longitudinally a sufficient distance to disengage the head from within the top of the socket. In the particular type of insulator disclosed it will be observed that there is a very close fit between the units, the space being so limited as to make it practically impossible to employ the ordinary type of cotter.

In accordance with the above pointed out difficulty, I provide a peculiar arrangement of elements comprising a cotter 21 which may initially be of conventional shape, that is to say with parallel legs or arms, together with a spring 22. In assembling this arrangement, the cotter 21 is passed through a hole 23 in the side of the socket, the spring 22 is placed about the cotter within the socket, and the arms or legs are spread as indicated at 24 in Figure 2 in order to provide means for engaging one end of the spring for placing the same under compression, as will be explained, and for preventing complete withdrawal of the pin.

Assuming that the insulator has been constructed as described and equipped with the locking device, it will be seen that when it is desired to assemble two units, they are moved relatively laterally to bring the head 20 of one into the slot 15 in the other. At this time the head will engage against the ends 24 of the cotter and push it against the resistance of the spring 22 so that it will be projected beyond the socket out of the way so that the head 20 may enter the socket with the pin 17 adjacent the head occupying the opening 14. When the head reaches its final and proper position it slips past the cotter whereupon the spring 22 which has been compressed between the ends 24 and the inside wall of the socket will expand and draw the cotter inwardly of the socket into its normal position beneath the head 20. Owing to the curvature at the top of the socket it is apparent that to disengage the pin from the cap it is necessary to move the pin downwardly with respect to the insulator next below before the ball head 20 can be brought into registration with and moved through the slot 15. As long as the cotter is in its normal position beneath the head 20 it is obvious that this cannot be done and the units will therefore be positively held against separation until the pin is positively withdrawn by some suitable tool if such is desired.

From the foregoing description and a study of the drawing it will be apparent that I have thus provided a very simple and inexpensive means for connecting insulator units of the ball and socket type and one which will avoid all the disadvantages and annoyances of the present type and at the same time afford a much more positive and efficient retaining means. The device is of particular advantage in connection with insulators of the close nesting type but it is of course apparent that it will likewise be of advantage even though the space may not be so limited. It is believed that the construction, operation and advantages will be readily apparent from the foregoing without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In combination, adjacent insulator units each of which comprises a dielectric body provided at its top with a cap formed with a socket and having an axial opening and a lateral slot communicating with the socket and also having a hole in the side of the socket opposite the lateral slot, each insulator further having a depending pin with an enlarged head, the depending pin of one unit being insertable through the lateral slot in the cap of the other insulator with the head received within the socket; and means for preventing disconnection of said units, said means comprising a retaining element slidable through said hole and having one end in obstructing relation to said lateral slot and spring means urging said element inwardly with respect to the socket.

2. In combination, adjacent insulator units each of which comprises a dielectric body provided at its top with a cap formed with a socket and having an axial opening and a lateral slot communicating with the socket and also having a hole in the side of the socket opposite the lateral slot, each insulator further having a depending pin with an enlarged head, the depending pin of one unit being insertable through the lateral slot in the cap of the other insulator with the head received within the socket; and means for preventing disconnection of said units, said means comprising a retaining member slidable through said hole with its inner end normally adjacent said lateral slot to be in obstructing relation to the introduction of the head therethrough, and a spring opposing movement of said member outwardly with respect to the socket.

3. In combination, adjacent insulator units each of which comprises a dielectric body provided at its top with a cap formed with a socket and having an axial opening and a lateral slot communicating with the socket and also having a hole in the side of the socket opposite the lateral slot, each insulator further having a depending pin with an enlarged head, the depending pin of one unit being insertable through the lateral slot in the cap of the other insulator with the head received within the socket; and means for preventing disconnection of said units, said means comprising a member slidable through said hole, spring means normally urging said member into position with its inner end obstructing passage of said head through said lateral slot, and means limiting movement of said member inwardly with respect to the socket.

4. In combination, adjacent insulator units each of which comprises a dielectric body provided at its top with a cap formed with a socket and having an axial opening and a lateral slot communicating with the socket and also having a hole in the side of the socket opposite the lateral slot, each insulator further having a depending pin with an enlarged head, the depending pin of one unit being insertable through the lateral slot in the cap of the other insulator with the head received within the socket; and means for preventing disconnection of said units, said means comprising a cotter slidably mounted within said hole and having its outer end enlarged to prevent passage through the hole, and spring means normally urging said cotter inwardly with respect to the socket.

5. In combination with adjacent insulator units each of which comprises a dielectric body provided at its top with a cap formed with a socket and having an axial opening and a lateral slot communicating with the socket and also having a hole in the side of the socket opposite the lateral slot, each insulator further having a depending pin with an enlarged head, the depending pin of one unit being insertable through the lateral slot in the cap of the other insulator with the head received within the socket; means for preventing disconnection of the units comprising a cotter slidably mounted within said hole and having its outer end enlarged to prevent passage through the hole, and spring means normally urging said cotter inwardly with respect to the socket, the inner ends of said cotter being outwardly extended to provide abutment means for the spring.

In testimony whereof I affix my signature.

KENT A. HAWLEY.